UNITED STATES PATENT OFFICE.

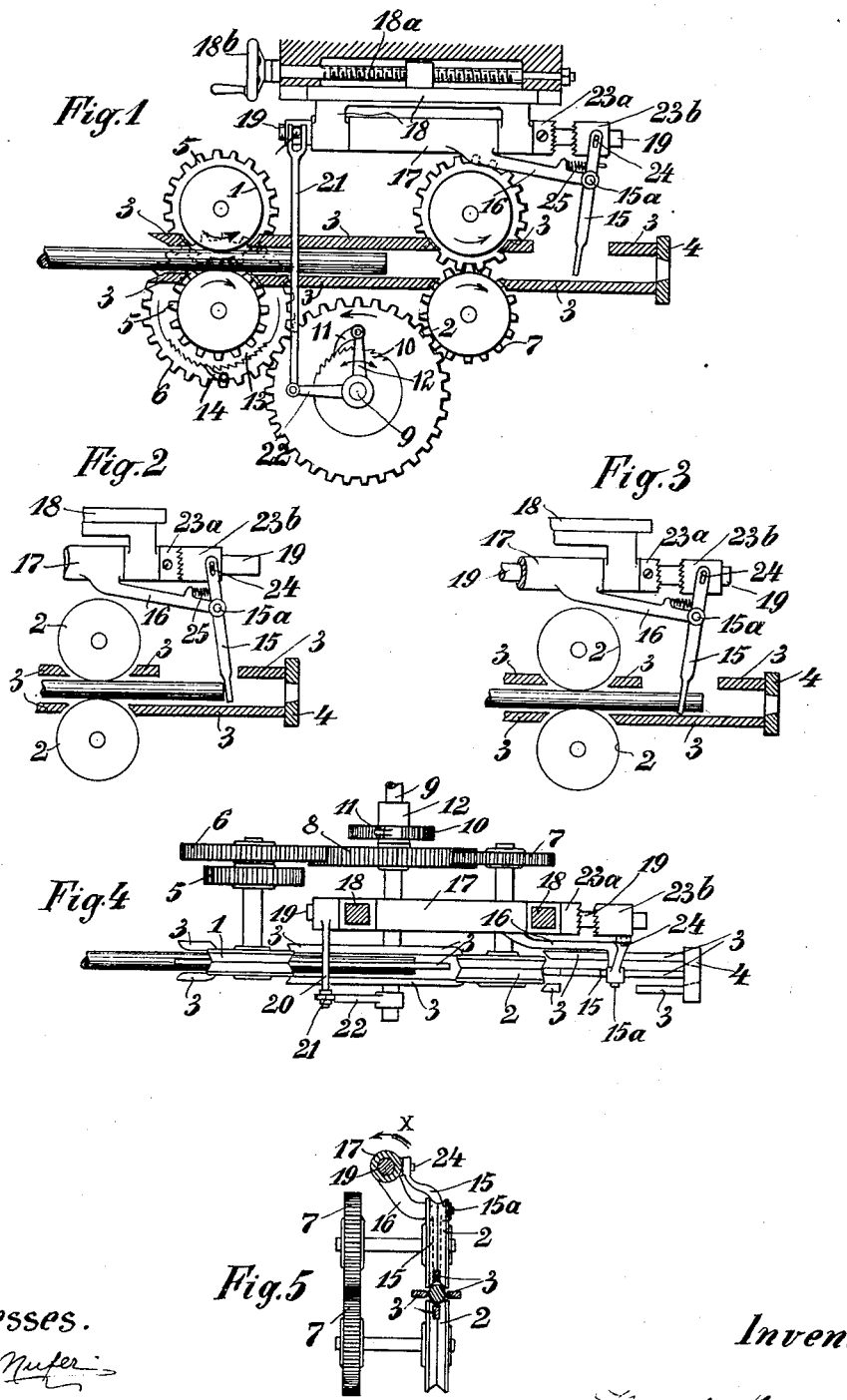

HANS MÜLLER, OF HAGEN, WESTPHALIA, GERMANY.

FEEDING AND CUTTING MECHANISM.

1,065,621.　　　Specification of Letters Patent.　　Patented June 24, 1913.

Application filed November 25, 1911. Serial No. 662,465.

*To all whom it may concern:*

Be it known that I, HANS MÜLLER, engineer, a citizen of the German Empire, residing at Hagen, in the Province of Westphalia, Germany, have invented certain new and useful Improvements in Feeding and Cutting Mechanism, of which the following is a specification.

My invention relates to improvements in feed mechanisms used in machines cutting articles of slender, straight rod-like shape, into parts of uniform size and shape.

The object of my invention is to provide a mechanism of the kind referred to, in which the production of waste is avoided, which has been caused in the devices heretofore in use by the circumstance that the rods, when received by the feeding device, were not caught by the latter in a proper relative position with respect to the cutting device. The rods fed into the cutting mechanism were not forwarded equally far and thus the pieces separated by the first cut were unequal. In my improved mechanism, however, each rod is prior to its arrival in the cutting device retained by a swinging detent, which is of such construction and so disposed that on its removal just so much of the feed is forwarded into the cutter as corresponds with the length of the piece to be cut off.

My mechanism may be employed in connection with continuous or intermittent roller feeding devices, an intermittent roller construction being by way of example shown on the drawing in which—

Figure 1 is a side view of the said feeding device provided with my improvements as herein described, a portion of the device being shown in vertical section; Fig. 2 is a portion of the same device, in side-view, in which, however, the operative parts are shown in another position, hereinbelow referred to; Fig. 3 is a similar view showing those parts in a third position, also hereinbelow referred to; Fig. 4 is a plan view of the feeding device and Fig. 5 a transverse section through the same.

The cutting mechanism is not shown on the drawing as, it forms no part of this invention, there being, moreover, no restriction as to the kind of cutters employed, which may be a saw or shears or any other cutting device.

The feed mechanism shown consists mainly of two feed-roller pairs 1 and 2 forwarding, the feed in the way already generally known by means of friction, and a guide formed of crosswise disposed bars 3 terminating in a mouth 4 opening into the cutting device. The said feed rollers shown, or in case of another feeding device the respective corresponding parts, are set to operation by means of a pair of toothed wheels 5 and a pinion 6, while the rollers 2, or other respective parts corresponding thereto, are set to motion by means of another pair of toothed wheels 7 and a common gear wheel 8 mounted loosely on a shaft 9 alternately rotated in the one and the other direction.

With the gear wheel 8 there is connected a ratchet wheel 10, into which engages a pawl 11 jointed to an arm 12 mounted on the shaft 9 in such relative position that by the alternate rotatory movement of the shaft 9 the said ratchet wheel 10 and by the intermediate action of the toothed wheels 8, 7, 6, 5 the roller pairs 1 and 2 are intermittently rotated in the feeding direction, the several gears being of such relative diameters that the rotation of the rollers 1 is slower than that of the rollers 2. Between the toothed wheel 6 and the roller pair 1 there is provided a detent mechanism consisting of a ratchet wheel 13 connected with the lower wheel 5 and of a pawl 14 secured to the wheel 6 and permitting a movement of the rollers 1 in advance to the latter. Thus the feed on arriving at the rollers 2 is permitted to join in the greater speed of these rollers without being affected by the slower moving rollers 1, so that the feed is forwarded always at equal speed.

Behind the feed rollers 2 and through an opening in the guide 3 the lower end of a double lever 15 extends into the said guide far enough that the feed forwarded by means of the rollers 1, 2 is pushed thereagainst. The said lever 15 is fulcrumed in an arm 16 in the box 17 rotatably mounted in a shaft 19 in a slide 18. The latter is movable by means of a screw 18$^a$ and a hand wheel 18$^b$ to permit the adjusting of the lever 15 in accordance with the intended length of the piece to be cut off from the feed.

On one end of the shaft 19 there is secured a lever 20 which is by means of a rod 21 so connected with a lever 22 securely keyed on the shaft 9 that the shaft 19 is also alternately rotated, such rotation being in the direction of the arrow $x$, Fig. 5, as long as the movement of the feed rollers 1, 2 remains interrupted, and in the opposite direction as long as it is going on. On the other end of the shaft 19 there is secured a clutch member $23^a$ in which there is engageable another clutch member $23^b$ which is, by means of a pivot 24 secured thereto, connected with the upper arm of the lever 15 and removable from the first mentioned member by the action of an intermediate spring 25 provided between the arm 16 and the said lever 15.

When the feed pushes against the lever 15 the latter is, in the direction in which the feed comes forward, swung up far enough to bring the clutch member $23^b$ in engagement with the stationary clutch member $23^a$. As the drawing shows, the clutch members are of such relative shape that only on the movement of the shaft 19 in the direction of the arrow $x$, Fig. 5, the clutch member $23^b$ engages the member $23^a$ to partake in such movement, the said member $23^b$ being adapted to carry along with it the lever 15 connected thereto.

The rods intended for division should be inserted between the rollers 1 by which each rod is seized and intermittently forwarded until it gets between the rollers 2 and is further forwarded by the latter until it pushes against the lever 15, which is thereby made to swing and cause the movable clutch member $23^b$ to engage the fixed clutch member $23^a$ whereupon a further forwarding is no more possible for the present (see Fig. 2). Whenever the intermittent forward movement of the feed rollers is not yet finished at the time, the feed pushes against the lever 15, the said rollers slide over the feed, duly kept fast until the intermittent movement has been finished. During the standstill of the roller pairs 1 and 2 now following the shaft 19 swings in the direction of the arrow $x$, Fig. 5, thereby causing the coupling member $23^a$ to engage and take along the member $23^b$ which, in turn, causes the lever 15 to swing about the shaft 19, the said lever departing from the guide and thus releasing the feed which is by the intermittent feeding movement next following pushed forward for a certain distance and fed into the cutter movement. When the lever 15 in its swinging movement has left the feed, it is by the action of the spring 25 made to turn around its axis $15^a$ in the direction opposite to that of the feed, the coupling being at the same time disengaged, permitting the lever 15 to swing downward again by the action of its own weight. It now settles alongside the feed (Fig. 3) and remains there until the latter in being pushed farther forward has passed by, whereupon it is permitted again to lay itself within the path of the feed and regulate the forward movement of the next following stick or rod (see Fig. 1).

The rods may be put into the feed mechanism in immediate succession. The rollers 1 rotating at a slower speed, than the rollers 2, a certain distance is automatically kept between the several feeds permitting the return of the lever 15 into the path of the feed.

It will be understood that the distance at which the first rod is being forwarded corresponds with the amount of feeding movement of the rollers 2 so that the first piece cut off has the same length as any of the next following pieces and there is no waste of material produced by the devices in use heretofore.

It will be understood that the lever 15 does not limit nor control the motion of the feeding rolls or that of the cutting device, nor interfere with the action of the rolls in presenting the rod to the cutter after it has been duly positioned with regard to these parts, but it insures in advance the accuracy of such presentation and withdraws from the rod during the action of the rolls in feeding the rod to the cutter. To state the matter more fully and clearly we may add: The feed intended to be cut into pieces is intermittently pushed forward by means of feeding roller pairs 1 and 2 in a guide bed formed by bars 3, so that with each push the feed is forwarded so much that it projects from the opening of a guide bed a distance which corresponds with the length of piece intended to be cut off, a cutting blade being provided right in front of the said mouth. There is no obstructive device by which each movement of the feed is limited, but the forward movement is controlled by a regulated movement of the rollers 1 and 2. In devices of this kind which are already known there is the drawback that whenever a new rod is being inserted the same is not seized by the feeding members when they are in a certain predetermined position in respect to the cutting device, and, consequently, the fore-end of the rod is never fed into the cutter at a uniform length and after the first cut there is always a waste piece, which is either too long or too short. The object of my invention is to avoid this disadvantage and I attain this object by means of a swinging detent lever 15, which each time so retains the newly inserted rod before it arrives at the cutting device that the fore-end of the rod is so placed that there is the desired uniform distance from the cutting device. When the rod has been inserted into the feeding device in this manner the lever 15 automatically releases the rod and has no office whatever any more while this rod is being cut into pieces.

Previous to inserting a feed rod into the device the aforesaid lever 15, which is turnable about its fulcrum 15ª assumes a position which is shown in Fig. 1 of the drawings, its lower end being suspended into the guide bed for the rod formed by the bars 3. Now, when a feed is inserted into the machine the rollers 2 get hold of it and effect the intermittent forward movement. During this operation the rod hits first the lever 15, so that the latter is made to turn about its fulcrum 15ª until it becomes engaged with its upper portion by a clutch formed by the members 23ª 23ᵇ and is thus prevented from further turning. It retains the feed rod in a certain fixed position, so that it cannot be moved forward any farther, even in case the feeding rollers have not yet completed their respective turn, the rollers in this case gliding on the feed rod. By the aforesaid engagement of the clutch 23ª 23ᵇ the lever 15 was put in connection with the shaft 19 which during the next following standstill period receives a turn in the direction of the arrow $x$ (Fig. 5). In this movement the lever 15 joins, so that it is thereby moved out of the guide formed by bars 3 and thus releases the feed rod. Directly thereafter the action of the spring 25 causes the lever 15 to move about its fulcrum 15ª and thereby a disengagement of the clutch members 23ª 23ᵇ and a release of the said lever from the shaft 19 is obtained, the said lever swinging now by gravity back into its former position and settling laterally, with the lower end against the feed rod. The forward movement being no longer obstructed by the lever 15, the feed rod is intermittently pushed forward and thus fed into the cutter, which cuts off pieces of uniform length. When the rod has in this operation passed the lever 15 the latter returns into its original starting position (Fig. 1) and is now in a position to act upon any new rod when the same is inserted. As is explained in the foregoing, the lever operates merely when a new rod is inserted, but not while the pieces are being cut, but it secures to the feed a predetermined position controllable by the operation of a hand-wheel 18ᵇ in its relation to the cutting device, and thus the advantage that the first piece cut off is of the desired uniform length.

I claim:

1. In the automatic feed mechanism of a cutting machine of the class referred to the combination therewith of a detent mechanism and of means adapted to actuate the same in conjunction with the traveling action of the feed the said detent mechanism being adapted to control the distance of the movement of the feed, substantially as described and for the purpose set forth.

2. In the automatic feed mechanism of a cutting machine of the class referred to the combination therewith of a detent mechanism, of means adapted to, in conjunction with the traveling action of the feed, operate the same, and of feeding devices operating at different speeds, substantially as described.

3. In an automatic feed mechanism for a cutting machine of the class referred to the combination therewith of a detent lever extending into the path of the feed, a spring adapted to actuate the said lever, an alternately rotating shaft, a box loosely turnable on the said shaft, an arm extending from the said box, the said lever being supported in the said arm and adapted to swing in the direction of the feed, a movable and rotatable coupling member connected with the said lever, another coupling member within engagement of the first-mentioned member, and of two sets of rollers adapted to be operated intermittently and at various speeds, substantially as described and for the purpose mentioned.

4. In combination, in automatic feed mechanism, a detent lever extending into the path of the feed, an alternately rotating shaft, a collar carried by said shaft, the upper end of said lever being slidably pivoted to said collar, an arm loosely mounted on said shaft and providing a fulcrum for said lever, a spring interposed between the upper part of said lever and said arm acting to force said arm and the upper part of said lever apart, an intermittently operated clutch connection between said collar and said shaft, and a pair of feeding rolls.

5. In combination, in automatic feed mechanism, a detent lever extending into the path of the feed, an alternately rotating shaft, a collar carried by said shaft, the upper end of said lever being connected to move with said collar, an arm loosely mounted on said shaft and providing a fulcrum for said lever, a spring interposed between said arm and the upper part of said lever, an intermittently operated clutch connection between said collar and said shaft and means for feeding the article to be operated upon.

In testimony whereof, I have signed my name to this specification in the presence of two subscribing witnesses.

HANS MÜLLER. [L. S.]

Witnesses:
 HELEN NUFER,
 ALBERT NUFER.